(12) United States Patent
Terakawa

(10) Patent No.: US 7,636,477 B2
(45) Date of Patent: Dec. 22, 2009

(54) DEVICE FOR DETECTING RED EYE, PROGRAM THEREFOR, AND RECORDING MEDIUM STORING THE PROGRAM

(75) Inventor: Kensuke Terakawa, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 633 days.

(21) Appl. No.: 11/089,011

(22) Filed: Mar. 25, 2005

(65) Prior Publication Data

US 2005/0226499 A1    Oct. 13, 2005

(30) Foreign Application Priority Data

Mar. 25, 2004   (JP)   ............................. 2004-089833
Mar. 23, 2005   (JP)   ............................. 2005-083916

(51) Int. Cl.
 *G06K 9/62* (2006.01)
(52) U.S. Cl. ...................... 382/209; 382/163; 396/155; 396/157; 396/158
(58) Field of Classification Search ................. 396/158, 396/155, 157; 382/160, 103, 163, 209
See application file for complete search history.

(56) References Cited

U.S. PATENT DOCUMENTS

| | | | | |
|---|---|---|---|---|
| 4,648,053 | A  * | 3/1987  | Fridge ........................ | 382/147 |
| 5,856,903 | A  * | 1/1999  | Smith .......................... | 361/96 |
| 5,990,973 | A  | 11/1999 | Sakamoto | |
| 6,278,491 | B1 | 8/2001  | Wang et al. | |
| 6,954,758 | B1 * | 10/2005 | O'Flaherty .................. | 707/102 |
| 7,047,412 | B2 * | 5/2006  | Echizen et al. .............. | 713/176 |
| 2004/0114829 | A1 * | 6/2004  | LeFeuvre et al. ............ | 382/275 |
| 2004/0160517 | A1 * | 8/2004  | Iida ........................ | 348/207.99 |
| 2004/0223063 | A1 * | 11/2004 | DeLuca et al. .............. | 348/239 |
| 2006/0104517 | A1 * | 5/2006  | Ko et al. ..................... | 382/209 |

FOREIGN PATENT DOCUMENTS

JP   6-258732 A   9/1994

OTHER PUBLICATIONS

Sergey Ioffe, "Red Eye Detection With Machine Learning", Proceedings of the Ninth IEEE International Conference on Computer Vision (ICVC 2003), vol. 2, pp. 871-874, Sep. 2003.

* cited by examiner

*Primary Examiner*—Matthew C Bella
*Assistant Examiner*—Dennis Rosario
(74) *Attorney, Agent, or Firm*—Sughrue Mion, PLLC

(57) ABSTRACT

Red-eye area detection accuracy is improved according to a pattern of appearance of red-eye areas generated frequently in an actual photography environment. A red-eye candidate area finding unit finds red-eye candidate areas in a digital photograph image, by using reference data. A display unit displays the image with the red-eye candidate areas having been marked and preliminary corrected. A user can specify an unfound red-eye area and an erroneously specified area by using a specification unit 22. An update unit 24 updates the reference data by learning a characteristic of the unfound red-eye area and the erroneously specified area so that a probability becomes higher regarding detection of an area having a characteristic similar to the unfound red-eye area as a red-eye candidate area while becomes lower regarding detection of an area having a characteristic similar to the erroneously specified area as a red-eye area.

15 Claims, 7 Drawing Sheets

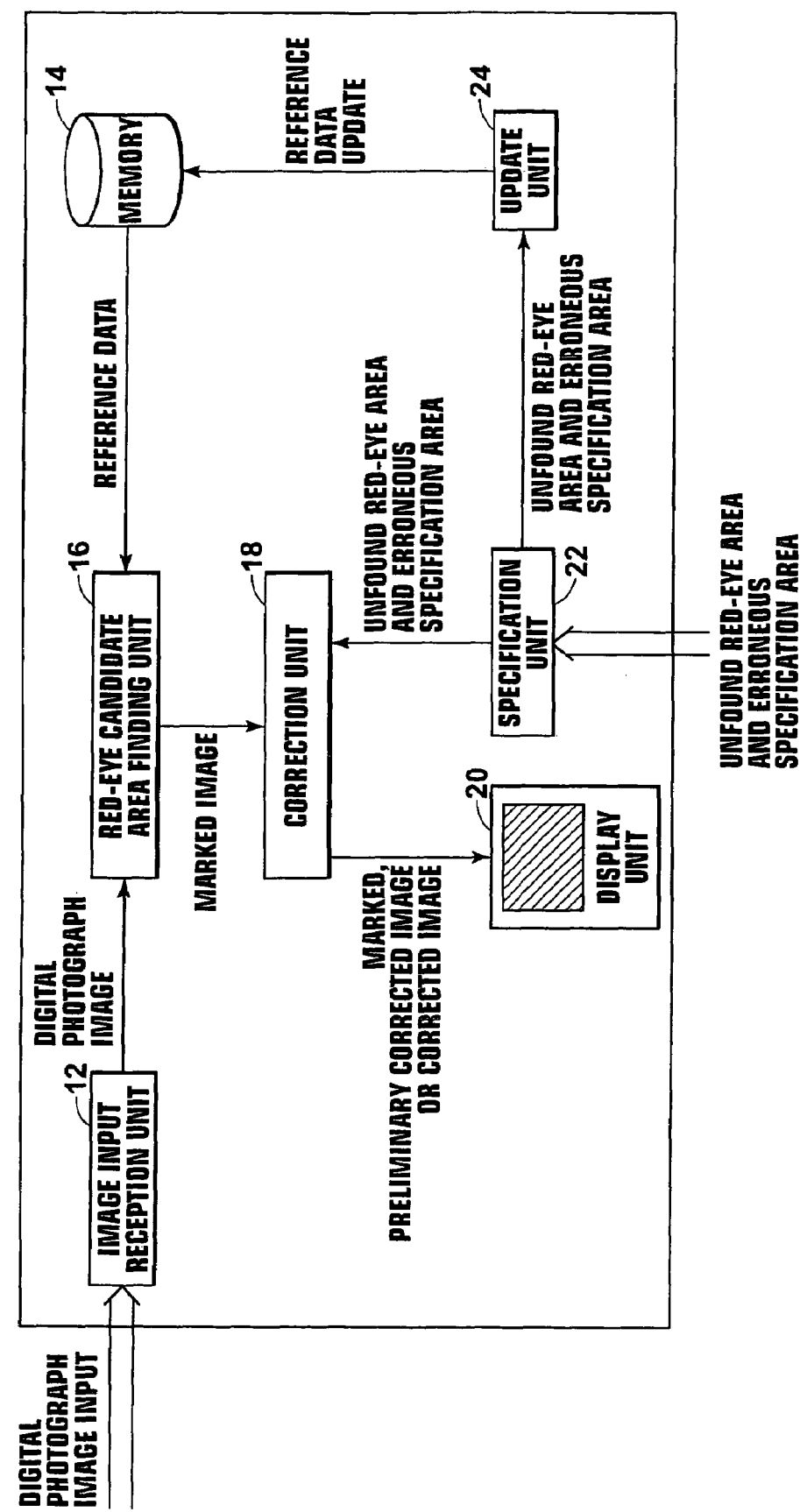

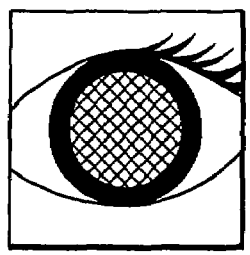 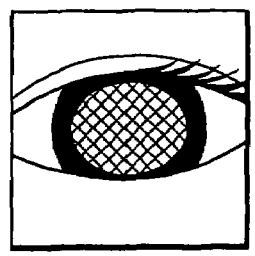
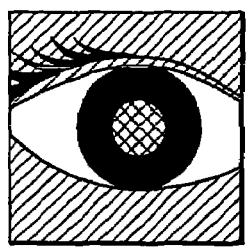 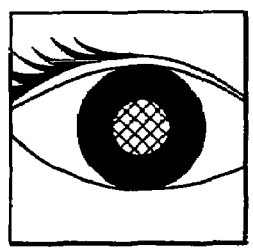
FIG.2A
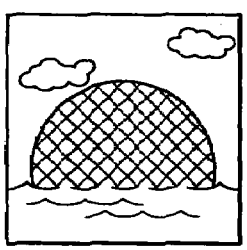 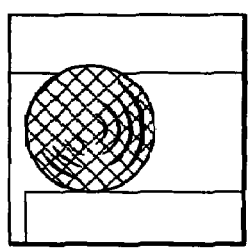
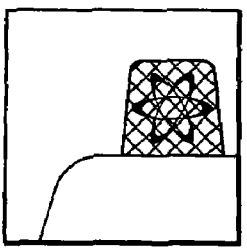 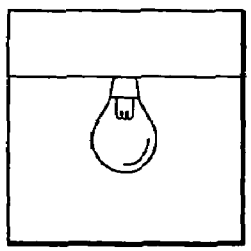
FIG.2B

• :POSITIVE SAMPLE IMAGES

× :NEGATIVE SAMPLE IMAGES

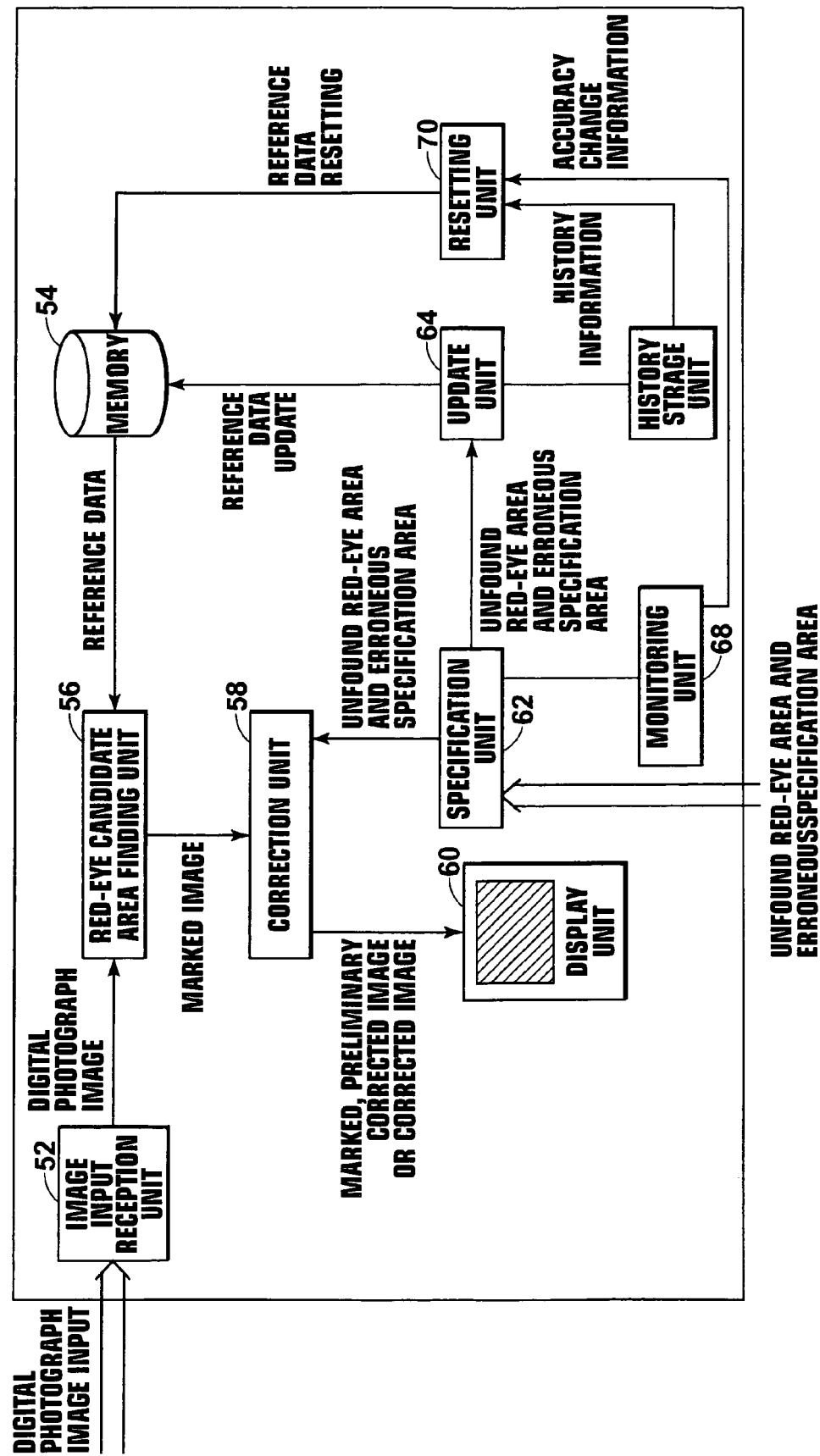

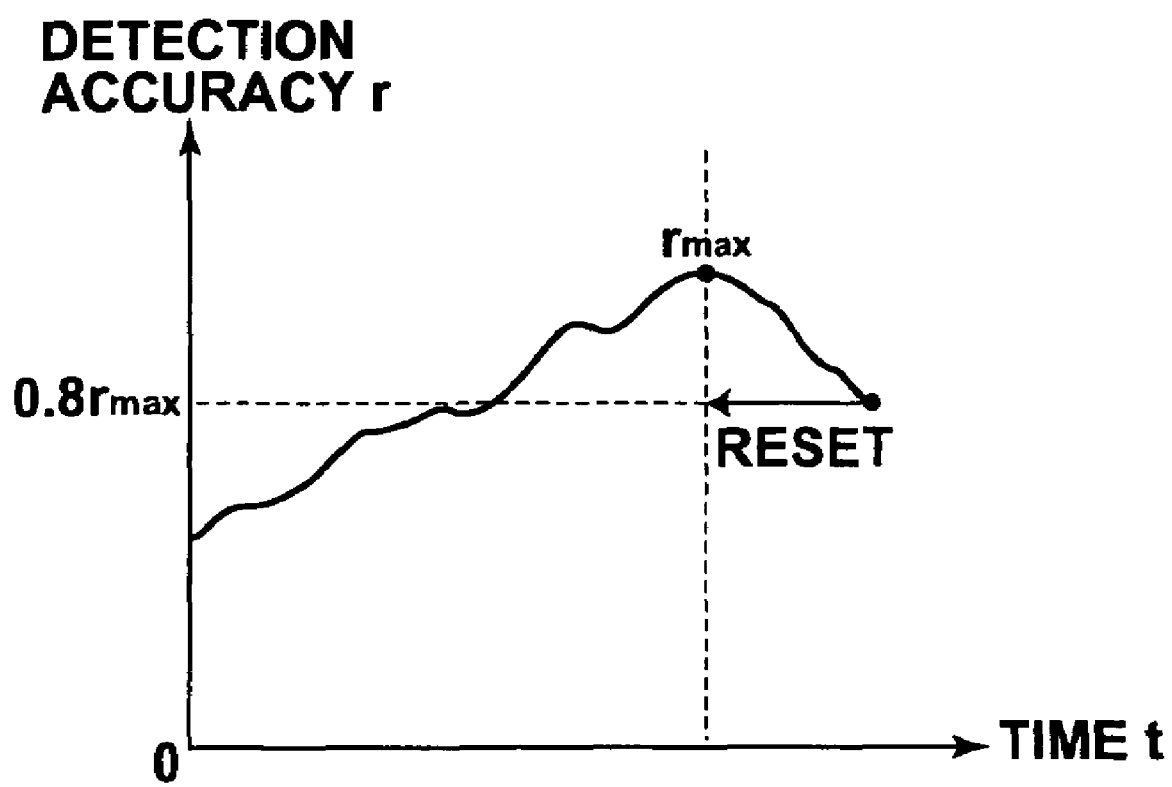

DEVICE FOR DETECTING RED EYE, PROGRAM THEREFOR, AND RECORDING MEDIUM STORING THE PROGRAM

BACKGROUND OF THE INVENTION

1. Field of the Invention

The present invention relates to a device for detecting red eye, a program therefor, and a recording medium storing the program. More specifically, the present invention relates to a red-eye detection device installable in a digital camera or a laboratory system for digital photographs, a program for detecting red eye, and a computer-readable recording medium storing the program.

2. Description of the Related Art

The red-eye phenomenon (hereinafter simply referred to as red eye) caused by flash photography of people damages natural appearance of a photograph, which is not desirable. Therefore, various methods of automatically or semi-automatically detecting a red-eye area in a digital photograph image have been proposed for color correction or the like of the red-eye area after photography.

For example, a method of semi-automatic red-eye area detection is described in U.S. Pat. No. 5,990,973. In this method, an area including pixels of most reddish color is specified as a red-eye area corresponding to one eye in a frame that has been specified by a user as a rough frame including the red-eye area in a digital photograph image. A red-eye area corresponding to the other eye is then searched for according to a positional relationship or the like with the former red-eye area.

An automatic method has also been described ("Red Eye Detection with Machine Learning", Sergey Ioffe, Proceedings of the Ninth IEEE International Conference on Computer Vision (ICVC 2003), Vol. 2, pp. 871-874, September 2003). In this method, reference data are prepared by using a machine learning method known as boosting, and a red-eye candidate area and a face area are detected in a digital photograph image by using the reference data. The red-eye candidate area in the face area is then confirmed as a red-eye area, and outline of the red-eye area is determined. Furthermore, various methods have been described in Japanese Unexamined Patent Publication No. 6(1994)-258732. For example, a red area and a skin-color area are detected in a digital photograph image according to a predetermined criterion set for pixel values in the Luv color specification system, and a red-eye area is detected by finding a logical product between the red area and a reversal of the skin-color area. Moreover, another method has been described in U.S. Pat. No. 6,278,491. In this method, a face area, an eye area in the face area, and an area of a red pupil in the eye area are serially detected in a digital photograph image according to a method based on neural network and principal component analysis.

However, red-eye areas in digital photograph images appear in various patterns, and learning or analyzing all the patterns in advance for setting a predetermined criterion is impossible in an automatic or semi-automatic red-eye detection method using the criterion. Therefore, failure of detection or erroneous detection of a red-eye area is inevitable. Furthermore, in a red-eye detection method using a predetermined criterion, failure of detection or erroneous detection always occurs for a red-eye area of a pattern of frequent appearance but not considered in learning in advance, or for an area of a pattern that has been considered as a red-eye area in learning in advance but is highly likely to be an area other than a red-eye area such as a red lamp.

SUMMARY OF THE INVENTION

The present invention has been conceived based on consideration of the above circumstances. An object of the present invention is therefore to improve red-eye area detection accuracy by a red-eye detection device, a red-eye detection program, and a recording medium storing the program. Especially, the present invention aims to improve red-eye area detection accuracy according to a pattern of appearance of red-eye areas that frequently occur in an actual photography environment.

More specifically, a red-eye detection device of the present invention comprises:

image input reception means for receiving input of a digital photograph image;

red-eye candidate area finding means for finding red-eye candidate areas in the digital photograph image by using reference data defining a characteristic of a red-eye area;

display means for displaying the digital photograph image so that a user can confirm positions of the red-eye candidate areas;

specifying means for enabling the user to specify a red-eye area that has not been found as one of the red-eye candidate areas, as an unfound red-eye area; and update means for carrying out an update of the reference data so as to improve a probability of finding an area having a similar characteristic to the unfound red-eye area as one of the red-eye candidate areas, by learning a characteristic of the unfound red-eye area.

In order to display the digital photograph image so that the user can confirm the positions of the red-eye candidate areas, any method of display can be used as long as the user can confirm the positions of the red-eye candidate areas. For example, the red-eye candidate areas may be marked with rectangular frames. In addition to the marking or instead of the marking, the red-eye candidate areas may be displayed after being subjected to provisional correction.

The red-eye detection device of the present invention may further comprise correction means for carrying out image correction so as to suppress apparent red eye, on the red-eye candidate areas and the unfound red-eye area.

The red-eye detection device of the present invention may also comprise:

history storage means for storing history of the update of the reference data by the update means;

monitoring means for monitoring a change of detection accuracy based on frequency of unfound red-eye area specification from the specifying means; and resetting means for resetting the reference data to a state at one time in the past stored by the history storage means when the detection accuracy becomes lower than a predetermined threshold.

In the red-eye detection device of the present invention, the reference data in an initial state thereof may be obtained by learning a sample image group comprising sample images representing images of red-eye areas and/or sample images representing images other than red-eye areas. In this case, the update means may have storage means for storing data of the sample image group so that the update means can carry out the update of the reference data by learning again a characteristic of the sample images comprising the sample image group and the characteristic of the unfound red-eye area.

In the red-eye detection device of the present invention, the user may be able to specify an area that has been found as one of the red-eye candidate areas but is not actually a red-eye area as an erroneously specified area by using the specifying means. In this case, the update means may carry out the update of the reference data so as to lower a probability of finding an area having a similar characteristic to the erroneously specified area as one of the red-eye candidate areas, by learning a characteristic of the erroneously specified area. The red-eye detection device of the present invention in this case may further comprise correction means for carrying out image correction on the red-eye candidate areas excluding the erroneously specified area and on the unfound red-eye area so as to suppress apparent red eye. The red-eye detection device in this case may also comprise:

history storage means for storing history of the update of the reference data by the update means;

monitoring means for monitoring a change of detection accuracy based on frequency of unfound red-eye area specification and erroneously specified area specification from the specifying means; and resetting means for resetting the reference data to a state at one time in the past stored by the history storage means when the detection accuracy becomes lower than a predetermined threshold. In the red-eye detection device in this case, the reference data in an initial state thereof may be obtained by learning a sample image group comprising sample images representing images of red-eye areas and/or sample images representing images other than red-eye areas. In this case, the update means may have storage means for storing data of the sample image group so that the update means can carry out the update of the reference data by learning again a characteristic of the sample images comprising the sample image group and the characteristic of the unfound red-eye area and the erroneously specified area.

A red-eye detection program of the present invention is a program for causing a computer to function as:

image input reception means for receiving input of a digital photograph image;

red-eye candidate area finding means for finding red-eye candidate areas in the digital photograph image by using reference data defining a characteristic of a red-eye area;

display means for displaying the digital photograph image so that a user can confirm positions of the red-eye candidate areas;

specifying means for enabling the user to specify a red-eye area that has not been found as one of the red-eye candidate areas, as an unfound red-eye area; and update means for updating the reference data so as to improve a probability of finding an area having a similar characteristic to the unfound red-eye area as one of the red-eye candidate areas, by learning a characteristic of the unfound red-eye area. A recording medium of the present invention is a computer-readable recording medium storing the red-eye detection program.

The "red-eye" referred to in this application is meant to include not only the so-called "red-eye" but also other eyes colored in strange colors such as gold or silver.

The red-eye detection device, the red-eye detection program, and the recording medium of the present invention update the reference data used for detection of the red-eye candidate areas so as to improve the probability of detection of an area having the similar characteristic to the unfound red-eye area as a red-eye candidate area by learning the characteristic of the unfound red-eye area specified by the user. Therefore, the red-eye area detection accuracy can be improved dynamically according to a pattern of appearance of red-eye areas generated frequently in an actual photography environment. Especially, in the case where the red-eye detection device, the red-eye detection program, or the recording medium of the present invention is installed in a digital camera, the red-eye area detection accuracy can be improved based on a pattern of appearance of red-eye areas that tend to occur on a person or in a photography environment frequently used by the user according to his/her preference. Furthermore, if the red-eye detection device, the red-eye detection program, or the recording medium of the present invention is installed in a laboratory system for printing digital photographs, the red-eye area detection accuracy can be improved according to a pattern of appearance of red-eye areas that tend to occur in a major human race in a place of installation of the system.

In the case where the reference data are updated for lowering the probability of detection of an area having the similar characteristic to the erroneously specified area as a red-eye candidate area by enabling the user to specify the erroneously specified area and by learning the characteristic of the erroneously specified area, the red-eye area detection accuracy can be improved dynamically according to a pattern of appearance of an object that is highly likely to be something other than a red-eye area in an actual photography environment.

Furthermore, if the correction means is used for carrying out the image correction so as to suppress apparent red eye, the image correction can be carried out with accuracy only on actual red-eye areas, by using information on specification of the unfound red-eye area and/or the erroneously specified area by the user. From a viewpoint of image correction, if an area not representing a red-eye area is corrected by being mistaken as a red-eye area or if an area actually representing a red-eye area is not corrected in a conventional method of semi-automatically or automatically detecting and correcting a red-eye area, additional correction is necessary through manual specification of a position of such an area. However, in the present invention, the information that conventionally needs to be specified for image correction is used not only for the image correction but also for feeding back to the reference data for detection accuracy improvement.

Furthermore, in the case where the history storage means, the monitoring means, and the resetting means are used, if the red-eye area detection accuracy is lowered due to learning the characteristic of the unfound red-eye area caused by a rare and special photography condition or the characteristic of the erroneously specified area having an extremely similar pattern as frequently generated red-eye areas, the reference data can be reset to the state in the past for resuming high detection accuracy.

In the case where the reference data are updated by learning again the characteristic of the sample images used for generation of the initial reference data and the characteristic of the unfound red-eye area and the erroneously specified area, the reference data can be updated gradually while generality of the reference data is maintained, without too much emphasis on the characteristic of the unfound red-eye area and the erroneously specified area.

Note that the program of the present invention may be provided being recorded on a computer readable medium. Those who are skilled in the art would know that computer readable media are not limited to any specific type of device, and include, but are not limited to: CD's, RAM's ROM's, hard disks, magnetic tapes, and internet downloads, in which computer instructions can be stored and/or transmitted. Transmission of the computer instructions through a network or through wireless transmission means is also within the scope of this invention. Additionally, the computer instructions include, but are not limited to: source, object, and executable code, and can be in any language, including higher level languages, assembly language, and machine language.

BRIEF DESCRIPTION OF THE DRAWINGS

FIG. 1 is a block diagram showing the configuration of a red-eye detection device of a first embodiment of the present invention;

FIGS. 2A and 2B show an example of a sample image group used for obtaining initial reference data;

FIG. 6 is a block diagram showing the configuration of a red-eye detection device of a second embodiment of the present invention; and FIG. 7 is a graph showing execution timing of a restoration operation by the red-eye detection device shown in FIG. 6.

DESCRIPTION OF THE PREFERRED EMBODIMENTS

Figure 3A:
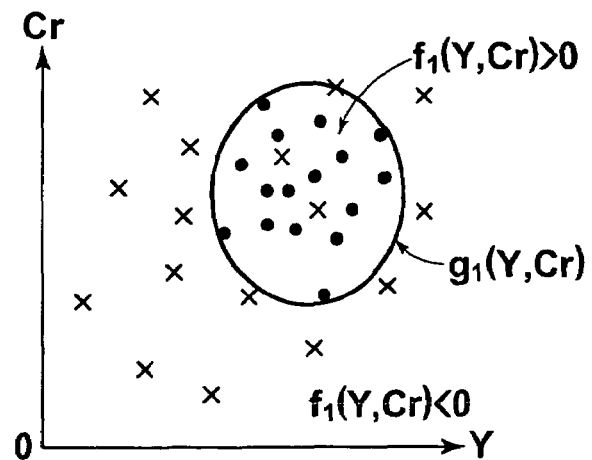
FIGS. 3A to 3C show an example of learning processing simplified as processing in a two-dimensional characteristic quantity space to obtain the initial reference data.

Hereinafter, embodiments of the present invention will be described in detail with reference to the accompanying drawings.

FIG. 1 is a block diagram showing the configuration of a red-eye detection device 10 of a first embodiment of the present invention. The red-eye detection device 10 comprises an image input reception unit 12 for receiving input of a digital photograph image, a memory 14 for storing reference data, a red-eye candidate area finding unit 16 for finding red-eye candidate areas in the digital photograph image based on the reference data, a correction unit 18 for carrying out image correction for suppressing red eye, a display unit 20, a specification unit 22 for receiving specification of an unfound red-eye area and an erroneously specified area from a user, and an update unit 24 for updating the reference data by accessing the memory 14.

The reference data stored in the memory 14 define a characteristic of a red-eye area to be detected, and provides a criterion for determining whether or not an area in the digital photograph image input to the red-eye detection device 10 is to be specified as a red-eye candidate area. In this embodiment, the reference data are obtained by learning in advance a sample image group shown in FIGS. 2A and 2B. The sample image group comprises sample images representing images of red-eye areas (hereinafter referred to as positive sample images) and sample images not representing red-eye areas (hereinafter referred to as negative sample images). Each of the positive sample images is an image in a standardized range as shown in FIG. 2A so that characteristics of eye areas in almost the same range including red eyes can be learned. The negative sample images may include any images of various kinds other than red-eye areas. Alternatively, the negative sample images may include images having characteristics which may lead to erroneous judgment as a red-eye area, such as sunset or an enlargement of a red lamp as shown in FIG. 2B. Each of the sample images has the same size.

The learning processing regarding the sample image group may adopt any method, and the reference data to be generated may take any form such as a reference table. In this embodiment, the reference data are generated in the form of a function according to learning processing using a method known as boosting. In typical boosting, characteristic quantities, that is, parameters representing characteristics are extracted from a first combination of sample data comprising a part of a sample data group to be learned, and plotted in a characteristic quantity space. A first comparatively simple curved surface or the like is defined in the characteristic quantity space for most preferably separating plotted points corresponding to data representing a specific feature from plotted points corresponding to data not representing the specific feature. A second combination of sample data that cannot be classified preferably by the first curved surface or the like is selected, and a second curved surface or the like is defined for most preferably classifying plotted points for the second combination. This procedure is repeated for learning. Finally, an optimal curved surface or an optimal function is then determined for dividing the characteristic quantity space according to majority or the like, by using the curved surfaces defined in the series of procedures.

In this embodiment, an average brightness Y and average color differences Cr and Cb are extracted as characteristic quantities from each of the sample images shown in FIGS. 2A and 2B, and plotted in a YCC color space. A function f(Y, Cr, Cb) is found as the reference data for defining whether each of the plotted points is a point corresponding to an image of red-eye area or to an image not representing a red-eye area. For the sake of simpler explanation, the method for learning will be described with reference to FIGS. 3A to 3C wherein the YCC color space is simplified to a two-dimensional Y-Cr plane.

Firstly, N (where N is a natural number) of the positive sample images and N of the negative sample images are selected randomly from the sample image group. The average brightness Y and the average color difference Cr are then extracted from each of the sample images to be plotted in the Y-Cr plane as shown in FIG. 3A. Thereafter, a quadratic curve $g_1(Y,Cr)$ is defined for most preferably classify the plotted points into points corresponding to the positive sample images and points corresponding to the negative sample images. A function $f_1(Y,Cr)$ is defined as a function taking a positive value in an area wherein the plotted points corresponding to the positive sample images divided by the quadratic curve $g_1(Y,Cr)$ are highly likely to be included while taking a negative value in an area wherein the plotted points corresponding to the negative sample images are highly likely to be included. The absolute value of the function $f_1(Y,Cr)$ at each of the points in the Y-Cr plane is defined by the distance between the corresponding point and the quadratic curve $g_1(Y, Cr)$, for example. The quadratic curve $g_1(Y, Cr)$ and the function $f_1(Y, Cr)$ are defined so as to cause an evaluation function below to become minimal:

Equation (1)

where $Y_i$ and $Cr_i$ represent coordinates of the plotted point corresponding to each of the sample images, while $y_i$ is a parameter taking +1 for the positive sample images but −1 for the negative sample images.

Figure 3B:
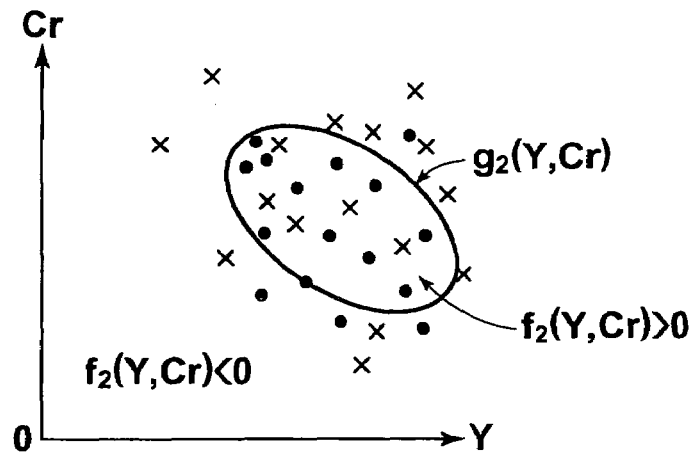

Another N of the positive sample images and another N of the negative sample images are selected from the sample image group. The average brightness Y and the average color difference Cr are extracted from each of the selected sample images and plotted in the Y-Cr plane as shown in FIG. 3B. The sample images may be selected randomly. Alternatively, in order to learn with emphasis the sample images whose classification was not carried out with accuracy by the function $f_1(Y,Cr)$, the positive and negative sample images whose classification result by the function $f_1(Y, Cr)$ did not show a higher correct classification rate than a predetermined threshold value may be selected. A quadratic curve $g_2(Y,Cr)$ and a function $f_2(Y,Cr)$ are also defined as shown in FIG. 3B in the same manner, for plotted points of the newly selected sample images.

Figure 3C:
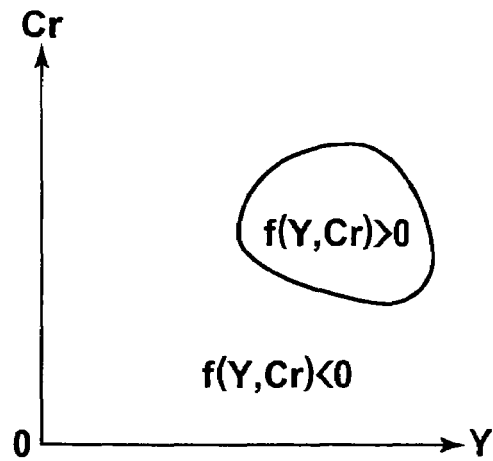

If a function f(Y,Cr) is defined as follows:

Equation (2)

current distribution of positive and negative values of the function f(Y,Cr), that is, the values of $f_1(Y,Cr)+f_2(Y,Cr)$ is as shown in FIG. 3C. Thereafter, another N of the positive sample images and another N of the negative sample images are further selected serially from the sample image group, and the function f(Y,Cr) is updated by serially finding functions $f_3(Y, Cr)$, $f_4(Y, Cr)$ and so on in the same manner until the correct classification rate by the function f(Y, Cr) for the sample image group converges with a predetermined minute range of improvement thereof.

The function f(Y,Cr) determined finally in the above manner is used as the reference data. If the value of the function f(Y, Cr) is positive for the average brightness Y and the average color difference Cr extracted from an area in a digital photograph image, the area can be detected as a red-eye candidate area. If the value is negative, the area is not judged to be a red-eye candidate area. The explanation using FIGS. 3A to 3C is simplified in the two-dimensional space. However, as has been described above, the actual reference data found and stored in the memory 14 in this embodiment are the function f(Y,Cr,Cb) defining whether each of points in the YCC color space corresponds to an image of a red-eye area or an image not representing a red-eye area.

Hereinafter, a procedure carried out by the red-eye detection device 10 shown in FIG. 1 will be described in detail.

The image input reception unit 12 receives input of the digital photograph image, and the digital photograph image is sent to the red-eye candidate area finding unit 16.

Figure 4:
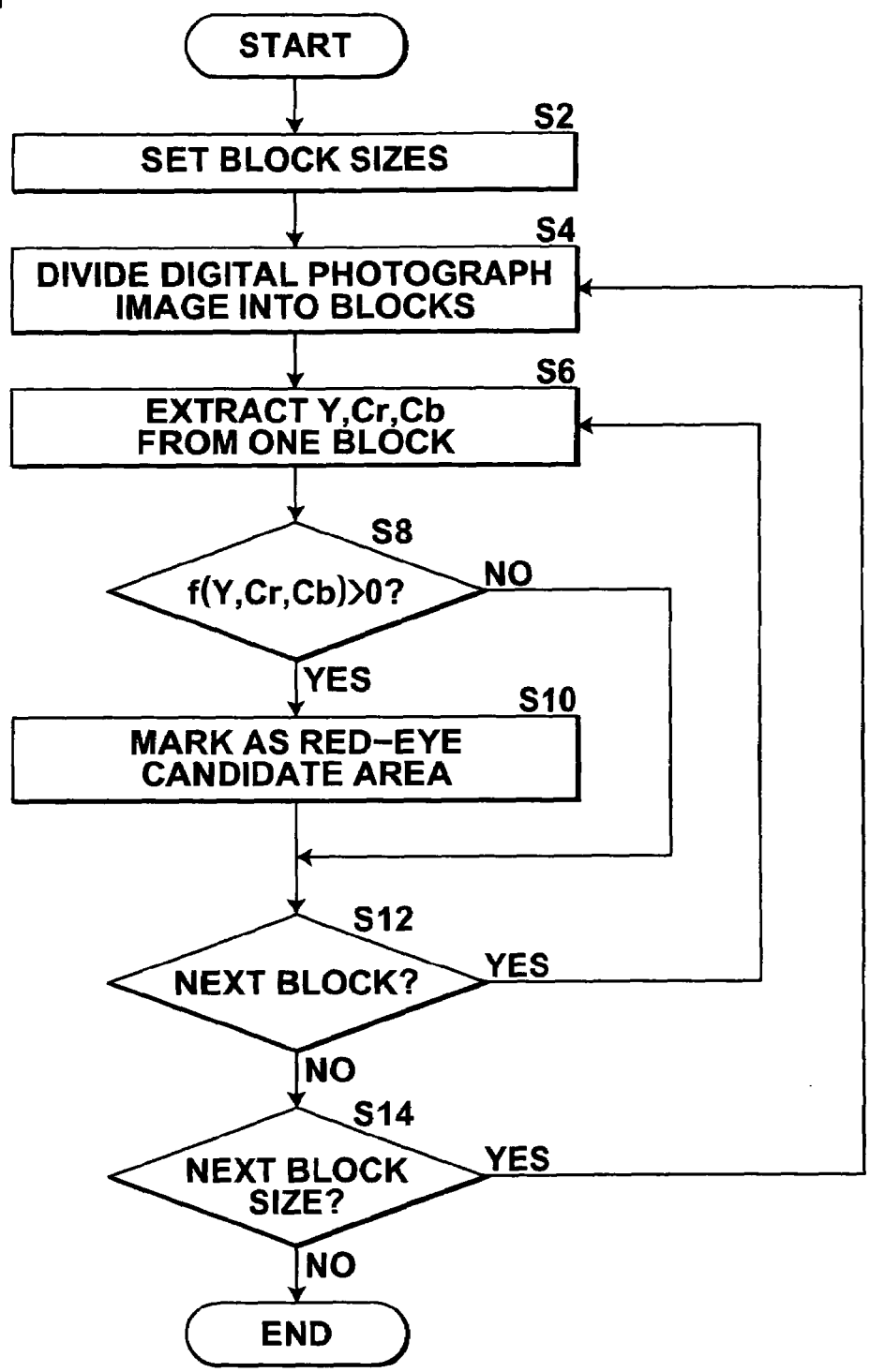
FIG. 4 is a flow chart showing a red-eye area finding procedure carried out by a red-eye candidate area finding unit in the red-eye detection device shown in FIG. 1.

The red-eye candidate area finding unit 16 finds the red-eye candidate areas in the digital photograph image according to a red-eye area finding procedure shown by a flow chart in FIG. 4. At Step S2, a plurality of block sizes (such as 4×4 pixels, 8×8 pixels, and 16×16 pixels) are determined for dividing the digital photograph image into blocks. Although the reference data for finding the red-eye candidate areas in this embodiment have been found by learning the sample image group including the positive sample images that have been standardized as shown in FIG. 2A, a size of a person and a size of a red-eye area actually vary from image to image. Therefore, the block sizes are applied for extracting the characteristics of eye areas in almost the same range as the positive sample images.

At Step S4, the red-eye candidate area finding unit 16 divides the digital photograph image into the blocks by using one of the block sizes determined at Step S2.

At Step S6, the red-eye candidate area finding unit 16 extracts the average brightness Y and the average color differences Cr and Cb as the characteristic quantities from one of the blocks obtained at Step S4.

At Step S8, the red-eye candidate area finding unit 16 judges whether the value of the function f(Y,Cr,Cb) corresponding to the values of Y, Cr, and Cb extracted at the immediately preceding Step S6 is positive or negative, by referring to the function f(Y,Cr,Cb) as the reference data in the memory 14. If the value is positive, the red-eye candidate area finding unit 16 judges at Step S10 that the current block is a red-eye candidate area, and marks the current block with a rectangular frame. In the case where the value of the function f(Y,Cr,Cb) is negative, the current block is not judged to be a red-eye candidate area, and the procedure goes to Step S12 from Step S8.

At Step S12, judgment is made as to whether another one of the blocks needs to be examined. If there is another one of the blocks that has not been examined yet, the procedure returns to Step S6 in FIG. 4. When all the blocks in the current block size have been examined for finding a red-eye candidate area, the procedure goes to Step S14 in FIG. 4 whereat judgment is made as to whether another one of the block sizes is available. If there is any one of the block sizes that has not been used yet, the procedure returns to Step S4. The procedure from Step S4 to Step S14 is repeated until judgment of a red-eye candidate area has been made for all the blocks in all the block sizes.

After completion of the red-eye area finding procedure shown in FIG. 4, the red-eye candidate area finding unit 16 sends to the correction unit 18 a marked image wherein all the red-eye candidate areas are marked with the rectangular frames in the digital photograph image. The correction unit 18 carries out provisional correction on probable red eye in the red-eye candidate areas in the marked image so as to suppress apparent red eye. This provisional correction may adopt any method. For example, each of the red-eye candidate areas is divided into areas and an area showing characteristics such as color (reddish color) and a shape (circular) of red eye most strongly among the divided areas is delimited as a red-eye area to be subjected to the correction (see Japanese Unexamined Patent Publication No. 2003-283849). In the correction in this method, lightness of all pixels in a probable red-eye area is caused to agree with minimum lightness therein, and saturation of all the pixels therein is further caused to agree with minimum saturation therein, for example. Only the correction of either the lightness or saturation may be carried out.

Figure 5A:
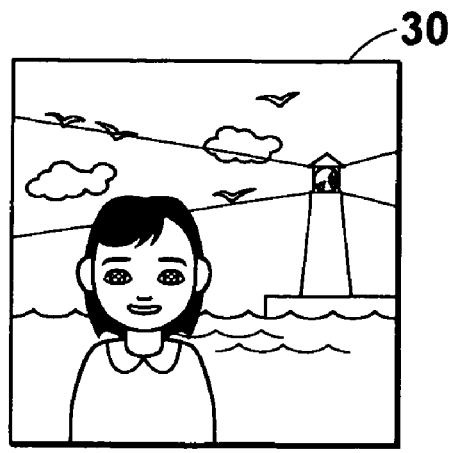
FIGS. 5A to 5C respectively show examples of a digital photograph image input to the red-eye detection device shown in FIG. 1, an image having been subjected to marking and provisional correction, and a corrected image to be output finally.
Figure 5B:
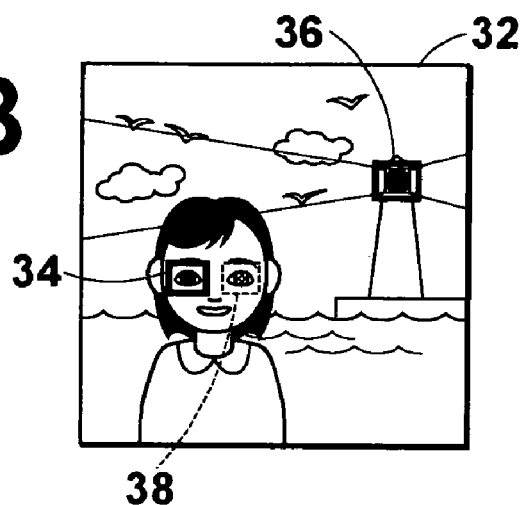

The digital photograph image having been subjected to the marking and the provisional correction is sent from the correction unit 18 to the display unit 20 for confirmation by a user. Assume that the digital photograph image in an original state thereof is an image 30 shown in FIG. 5A, and the image displayed on the display unit 20 via the red-eye candidate area finding unit 16 and the correction unit 18 is an image 32 shown in FIG. 5B. In the image 32, an area 34 is a red-eye candidate area that has been found, marked, and preliminary corrected properly while an area 36 is an erroneously specified area that is not a red-eye area actually but has been found, marked, and preliminary corrected erroneously. An area 38 is an unfound red-eye area that is actually a red-eye area but has not been found.

The user confirming the image 32 can manually input specification of the areas 36 and 38 to the specification unit 22, as the erroneously specified area and the unfound red-eye area, respectively. Information on the erroneously specified area 36 and the unfound red-eye area 38 is sent from the specification unit 22 to the correction unit 18 and to the update unit 24.

Figure 5C:
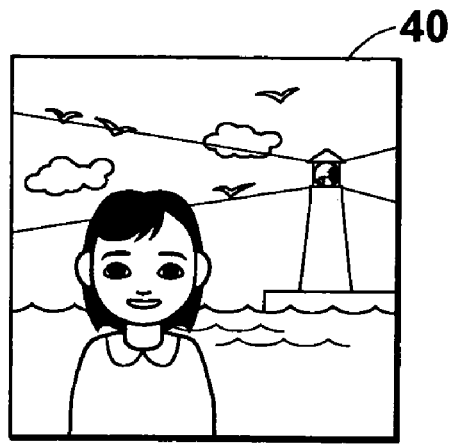

The correction unit 18 changes the erroneously specified area 36 to the state before the provisional correction, and carries out image correction on a red-eye area in the unfound red-eye area 38 so as to suppress apparent red eye therein. The image correction on the unfound red-eye area 38 can be carried out in the same manner as the provisional correction. Alternatively, the correction unit 18 may only change the erroneously specified area 36 to the state before the provisional correction and the user manually carries out the image correction on the unfound red-eye area 38. The digital photograph image having been subjected to the change and the correction is an image 40 shown in FIG. 5C and displayed on the display unit 20.

The update unit 24 extracts the average brightness Y and the average color differences Cr and Cb from the erroneously specified area 36 and the unfound red-eye area 38 as the characteristic quantities thereof, and stores the characteristic quantities as relearning data for updating the reference data. After a predetermined amount of the relearning data have been stored, the update unit 24 accesses the memory 14 for updating the function f(Y,Cr,Cb) as the reference data. For this update, the relearning data may be plotted in the YCC color space so that an additional function $f_j(Y, Cr, Cb)$ is found in the same manner as the method shown by FIG. 3A. The additional function $f_j(Y, Cr, Cb)$ is then added to the existing function f(Y, Cr, Cb) for update thereof. Alternatively, a memory may be prepared in the update unit 24 for storing data of the sample image group used for finding the function f(Y,Cr,Cb). In this case, the function f(Y,Cr,Cb) is updated by learning all the data of the sample image group and the relearning data according to the method shown by FIGS. 3A to 3C, for example.

According to the red-eye detection device 10 of the first embodiment of the present invention, the reference data used for finding the red-eye candidate areas can be updated in such a manner that a probability of detection of an area having a characteristic similar to the unfound red-eye area as a red-eye candidate area becomes higher and a probability of detection of an area having a characteristic similar to the erroneously specified area as a red-eye candidate area becomes lower. Therefore, red-eye area detection accuracy can be improved dynamically according to a pattern of appearance of red-eye areas frequently generated in an actual photography environment and a pattern of appearance of an object that is highly likely to be something other than a red-eye area in an actual photography environment.

The red-eye detection unit 10 in the first embodiment can be installed in a digital camera or a laboratory system for printing digital photographs, by being built therein or by being connected thereto. In the case where the red-eye detection device 10 is installed in a digital camera, red-eye area detection accuracy can be improved according to a pattern of appearance of red-eye areas that tend to be generated on a person or in a photography environment frequently used by each user according to his/her preference. Furthermore, if the red-eye detection device 10 is installed in a laboratory system for printing digital photographs, red-eye area detection accuracy can be improved according to a pattern of appearance of red-eye areas that tend to occur in a major human race in a place of installation of the system. Furthermore, the relearning data may be stored at the time the digital camera is used or in daytime when the laboratory system is in operation, while the reference data can be updated at night or during charging wherein calculation resources are abundantly available.

In the red-eye detection device 10 in the first embodiment, the correction unit 18 carries out the provisional correction and the digital photograph image having been subjected to the marking and the provisional correction is displayed on the display unit 20 for confirmation by the user. However, the marked image may be displayed without correction by being sent directly from the red-eye candidate area finding unit 16 to the display unit 20 so that the correction is carried out collectively after specification of the unfound red-eye area and the erroneously specified area. The manner of initial display of the image on the display unit 20 can be any manner as long as the user can confirm positions of the red-eye candidate areas.

The red-eye detection device 10 in the first embodiment has the correction unit 18 for collectively carrying out the correction. However, the correction may be carried out by a separated device or the like. In this case, the red-eye detection device 10 only carries out the red-eye area finding procedure, the specification of the unfound red-eye area and the erroneously specified area, and the update of the reference data.

In the red-eye detection device 10 in the first embodiment, the user can specify both the unfound red-eye area and the erroneously specified area, and the reference data are updated by learning the unfound red-eye area and the erroneously specified area. However, only a characteristic of the unfound red-eye area may be learned.

The learning processing carried out by the update unit 24 for updating the reference data may adopt any method including boosting described above.

The initial reference data stored in the memory 14 are not limited to reference data obtained through machine learning. The reference data may be determined empirically.

Although the red-eye detection device 10 in the first embodiment of the present invention has been described above, a program causing a computer to function as means corresponding to the image input reception unit 12, the red-eye candidate area finding unit 16, the correction unit 18, the display unit 20, the specification unit 22, and the update unit 24 in order to carry out the processing for red-eye detection is also an embodiment of the present invention. A computer-readable recording medium storing the program is also an embodiment of the present invention. Various modifications can be made to the program and the recording medium. For example, the processing for causing a computer to function as means corresponding to the correction unit 18 may be omitted and carried out by another program.

A second embodiment of the present invention will be described next with reference to FIG. 6. FIG. 6 is a block diagram showing the configuration of a red-eye detection device 50 of the second embodiment. Functions of an image input reception unit 52, a memory 54, a red-eye candidate area finding unit 56, a correction unit 58, a display unit 60, a specification unit 62, and an update unit 64 are the same as the corresponding units in the red-eye detection device 10 in the first embodiment. Processing carried out by these units is also the same as the processing described with reference to FIGS. 1 to 4. Therefore, description of these units is omitted, and only a difference from the red-eye detection device 10 in the first embodiment will be described below.

The red-eye detection device 50 in the second embodiment has a history storage unit 66, a monitoring unit 68, and a resetting unit 70. The red-eye detection device 50 has a restoration function for resetting the reference data to a state at one time in the past in the case where the red-eye area detection accuracy becomes lower than a predetermined threshold, which is the difference from the red-eye detection device 10 in the first embodiment.

FIG. 7 is a graph showing an example of execution timing of a restoration operation in the red-eye detection device 50. The history storage unit 66 in the red-eye detection device 50 stores history of update of the reference data by the update unit 64 while the reference data in the memory 54 are updated. The red-eye area detection accuracy regarding actual digital photograph images generally improves as the update progresses. However, the detection accuracy becomes lower in some cases if learning is carried out on a characteristic of an unfound red-eye area generated in a rare and special photography situation or on a characteristic of an erroneously specified area having by chance a pattern of appearance that is similar to frequently generated red-eye areas. Therefore, in this embodiment, the monitoring unit 68 monitors a change of red-eye area detection accuracy r, based on frequency of specification of unfound red-eye areas and erroneously specified areas by the specification unit 62. If the detection accuracy r becomes as low as 80% of a maximum value $r_{max}$ ever recorded, the resetting unit 70 is activated for resetting the reference data to the state at which the maximum value $r_{max}$ was achieved. In this manner, the maximum value $r_{max}$ can be resumed in the case where the detection accuracy r becomes lower.

The execution timing of the restoration operation shown in FIG. 7 is a mere example, and any other criterion may be adopted. In addition, the reference data may be reset to a default state instead of resetting to the state of maximum detection accuracy $r_{max}$, for example.

Although the red-eye detection device 50 of the second embodiment of the present invention has been described above, a program for causing a computer to function as means corresponding to the image input reception unit 52, the red-eye candidate area finding unit 56, the correction unit 58, the display unit 60, the specification unit 62, the update unit 64, the history storage unit 66, the monitoring unit 68, and the resetting unit 70 in order to carry out the processing for red-eye detection and the restoration operation is also an embodiment of the present invention. A computer-readable recording medium storing the program is also an embodiment of the present invention. Various modifications can be made to the program and the recording medium. For example, the processing for causing a computer to function as means corresponding to the correction unit 58 may be omitted to be carried out by another program.

When a user tries to find red-eye areas, some red-eye areas are left unfound. In order to assist the user to specify the unfound red-eye areas, it is possible to provide a means which shows the user a position or positions where there is a high probability of existence of unfound red-eye area or areas, based on the results of detection of a red-eye or the face, thereby assisting the user to specify a red-eye area or areas. For example, such means that shows a user the position may comprise a means for showing the position of the possible unfound red-eye area in an enlarged scale at a position where a high possibility of existence of another eye is expected based on the results of detection of red-eye area in the case where one red-eye was found, or showing the position of the possible unfound red-eye areas in an enlarged scale at positions where a high possibility of existence of eyes is expected based on the results of detection of a face in the case where a face was detected.

Further, the learning of the characteristics of the re-eye candidate areas may combine the characteristics of the re-eye candidate areas with the photographing conditions or camera features. For example, the red-eye areas may be classified according to the intensity of the flash-light or the brightness of the scene and red-eye area specifying means particularly may be prepared for the respective classified red-eye areas, so that samples for learning may be classified according to the same classification and submitted for re-learning of the respective red-eye candidate area specifying means. By such learning after classification, the learning can be effectively carried out and the efficiency of specification of red-eye candidate areas is enhanced.

Furthermore, in re-learning, it is desirable to add not only the unfound red-eye areas, but also the correctly specified areas to the data for re-learning as correct results of specification.

The preferred embodiments of the present invention described above in detail are merely examples, and it is intended that the appended claims cover the true spirit and scope of the present invention.

What is claimed is:

1. A red-eye detection device comprising:
    image input reception means for receiving input of a digital photograph image;
    red-eye candidate area finding means for finding red-eye candidate areas in the digital photograph image by using reference data defining a characteristic of a red-eye area;
    display means for displaying the digital photograph image so that a user can confirm positions of the red-eye candidate areas that have been found;
    specifying means for enabling the user to specify a red-eye area that has not been found as one of the red-eye candidate areas, as an unfound red-eye area;
    update means for carrying out an update of the reference data so as to improve a probability of finding another area having a similar characteristic to the unfound red-eye area as one of the red-eye candidate areas, by learning a characteristic of the unfound red-eye area that has been specified;
    history storage means for storing history of the update of the reference data by the update means;
    monitoring means for monitoring a change of detection accuracy based on frequency of specification of the unfound red-eye areas from the specifying means; and
    resetting means for resetting the reference data to a state at one time in the past stored by the history storage means when the detection accuracy becomes lower than a predetermined threshold.

2. The red-eye detection device according to claim 1, further comprising correction means for carrying out image correction so as to suppress apparent red eye, on the red-eye candidate areas that have been found and the unfound red-eye area that has been specified.

3. The red-eye detection device according to claim 2, wherein the reference data in an initial state thereof are obtained by learning a sample image group comprising sample images representing images of red-eye areas and/or sample images representing images other than red-eye areas, and
    the update means has storage means for storing data of the sample image group and carries out the update of the reference data by learning again a characteristic of the sample images comprising the sample image group and the characteristic of the unfound red-eye area that has been specified.

4. The red-eye detection device according to claim 1, wherein the reference data in an initial state thereof are obtained by learning a sample image group comprising sample images representing images of red-eye areas and/or sample images representing images other than red-eye areas, and
    the update means has storage means for storing data of the sample image group and carries out the update of the reference data by learning again a characteristic of the sample images comprising the sample image group and the characteristic of the unfound red-eye area that has been specified.

5. The red-eye detection device according to claim 1, wherein the user is able to specify an area that has been found as one of the red-eye candidate areas but is not actually a red-eye area as an erroneously specified area by using the specifying means, and
    the update means carries out the update of the reference data so as to lower a probability of finding an area having a similar characteristic to the erroneously specified area as one of the red-eye candidate areas, by learning a characteristic of the erroneously specified area that has been specified.

6. The red-eye detection device according to claim 5 further comprising correction means for carrying out image correction on the red-eye candidate areas excluding the erroneously specified area and on the unfound red-eye area so as to suppress apparent red eye.

7. The red-eye detection device according to claim 6, wherein said
monitoring means monitors a change of detection accuracy based on frequency of specification of the unfound red-eye areas and the erroneously specified areas from the specifying means.

8. The red-eye detection device according to claim 7, wherein the reference data in an initial state thereof are obtained by learning a sample image group comprising sample images representing images of red-eye areas and/or sample images representing images other than red-eye areas, and
the update means has storage means for storing data of the sample image group and carries out the update of the reference data by learning again a characteristic of the sample images comprising the sample image group and characteristics of the unfound red-eye area and the erroneously specified area.

9. The red-eye detection device according to claim 6, wherein the reference data in an initial state thereof are obtained by learning a sample image group comprising sample images representing images of red-eye areas and/or sample images representing images other than red-eye areas, and
the update means has storage means for storing data of the sample image group and carries out the update of the reference data by learning again a characteristic of the sample images comprising the sample image group and characteristics of the unfound red-eye area and the erroneously specified area.

10. The red-eye detection device according to claim 5, wherein said
monitoring means monitors a change of detection accuracy based on frequency of specification of the unfound red-eye areas and the erroneously specified areas from the specifying means.

11. The red-eye detection device according to claim 10, wherein the reference data in an initial state thereof are obtained by learning a sample image group comprising sample images representing images of red-eye areas and/or sample images representing images other than red-eye areas, and
the update means has storage means for storing data of the sample image group and carries out the update of the reference data by learning again a characteristic of the sample images comprising the sample image group and characteristics of the unfound red-eye area and the erroneously specified area.

12. The red-eye detection device according to claim 5, wherein the reference data in an initial state thereof are obtained by learning a sample image group comprising sample images representing images of red-eye areas and/or sample images representing images other than red-eye areas, and
the update means has storage means for storing data of the sample image group and carries out the update of the reference data by learning again a characteristic of the sample images comprising the sample image group and characteristics of the unfound red-eye area and the erroneously specified area.

13. The red-eye detection device according to claim 1 further comprising a means for showing a user a position or positions where there is a high probability of existence of unfound red-eye area or areas based on the results of detection of a red-eye or the face, thereby assisting the user to specify a red-eye area or areas.

14. The red-eye detection device according to claim 13, wherein the means for showing a user the position comprises means for showing the position of the possible unfound red-eye area in an enlarged scale at a position where a high possibility of existence of another eye is expected based on the results of detection of red-eye area in the case where one red-eye was found, or showing the position of the possible unfound red-eye areas in an enlarged scale at positions where a high possibility of existence of eyes is expected based on the results of detection of a face in the case where a face was detected.

15. A computer-readable recording medium storing a red-eye detection program for causing a computer to function as:
image input reception means for receiving input of a digital photograph image;
red-eye candidate area finding means for finding red-eye candidate areas in the digital photograph image by using reference data defining a characteristic of a red-eye area;
display means for displaying the digital photograph image so that a user can confirm positions of the red-eye candidate areas;
specifying means for enabling the user to specify a red-eye area that has not been found as one of the red-eye candidate areas, as an unfound red-eye area;
update means for updating the reference data so as to improve a probability of finding another area having a similar characteristic to the unfound red-eye area as one of the red-eye candidate areas, by learning a characteristic of the unfound red-eye area;
history storage means for storing history of the update of the reference data by the update means;
monitoring means for monitoring a change of detection accuracy based on frequency of specification of the unfound red-eye areas from the specifying means; and
resetting means for resetting the reference data to a state at one time in the past stored by the history storage means when the detection accuracy becomes lower than a predetermined threshold.

* * * * *